United States Patent Office 3,305,496
Patented Feb. 21, 1967

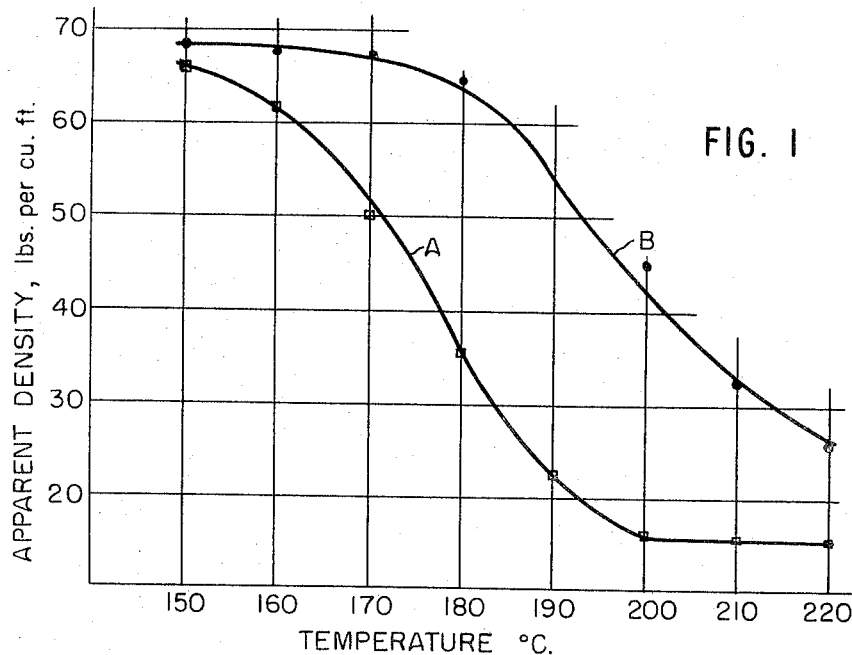
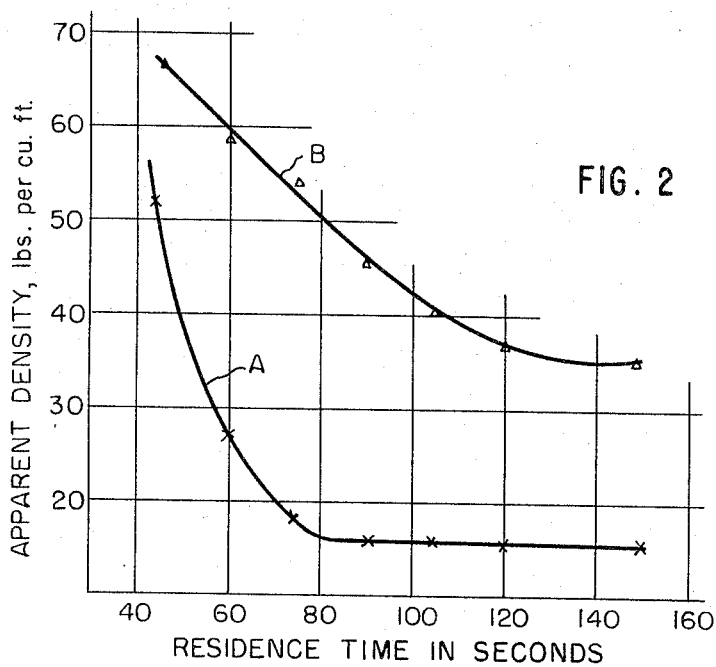

3,305,496
ACTIVATED AZODICARBONAMIDE
Charles P. Riley, Jr., Lowell, Henry R. Lasman, Wilmington, and Richard Strauss, Watertown, Mass., assignors, by mesne assignments, to National Polychemicals, Inc.
Filed Feb. 11, 1963, Ser. No. 257,567
11 Claims. (Cl. 260—2.5)

Our invention relates to compositions to activate chemical blowing agents, to the activated blowing agent compositions and to plastic compositions containing these compositions. In particular our invention concerns a composition to activate azodicarbonamide compositions to provide a substantial lowering of the decomposition temperature of the azodicarbonamide.

The selection of a suitable chemical blowing agent compound for forming cellular and foamed plastic is commonly made with reference to the temperature at which the blowing agent compound decomposes to evolve gas and to the fluidity temperature range of the plastic to be blown. Azodicarbonamide has a decomposition temperature in air of about 195 to 200° C. and about 190° C. in dioctyl phthalate. For many applications it is desirable to have azodicarbonamide decompose at a much lower temperature. Decomposition at a lower temperature would permit a reduction in the heat degradation of the plastic composition in which the chemical blowing agent is incorporated. Further lower decomposition temperatures would permit shorter processing cycles and allow enhanced decomposition rates thereby permitting lower processing temperatures or shorter residence times or a combination thereof.

It is now known that some heavy metal compounds have an activating effect on chemical blowing agents, that is they tend to lower the decomposition temperature at which the blowing agent evolves gas. However, even the most active heavy metal compounds fail to lower the decomposition temperature of azodicarbonamide below about 160° C. For example, dibasic lead phosphite lowers the decomposition temperature of azodicarbonamide in a typical plastisol composition to about 170° C.

It is, therefore, an object of our invention to provide a composition which will substantially lower the decomposition temperature of azodicarbonamide. It is also an object of our invention to provide an activated azodicarbonamide composition which has enhanced decomposition rate. It is a further object of our invention to provide an organic resinous plastic composition containing an azodicarbonamide blowing agent which composition is capable of being decomposed to produce a chemically blown cellular structure at a decomposition temperature below 160° C. Further objects and advantages of our invention will be apparent to those persons skilled in the art from the following description of our invention taken in conjunction with the accompanying drawings wherein:

FIG. 1 is a graphical illustration of the advantage of one embodiment of our invention compared to a conventional metal activated composition showing the degree of expansion versus the temperature.

FIG. 2 is a graphical illustration of the advantages of one embodiment of our invention compared to a conventional metal activating composition showing the degree of expansion versus the residence time.

We now have found that the decomposition temperature of azodicarbonamide is substantially lowered to below 160° C. by an activating composition comprising an admixture of a heavy metal-containing compound in combination with an alkali metal-containing compound. Further we have discovered that the employment of very finely divided azodicarbonamide having an average particle size range of about 2.8 microns, or less, in combination with the activating composition of our invention further lowers the decomposition temperature of the azodicarbonamide to about 140° C. or below. Additionally, our activating composition also promotes the heat and light stability of the plastic composition in which they are incorporated. This reduction in decomposition temperature is quite unexpected in that admixtures of heavy metal and alkaline earth metals, or mixtures of alkaline earth metals themselves fail to produce similar results.

The heavy metals of our composition comprises polyvalent heavy metals, and includes those metals of Group II, such as calcium, strontium, barium and particularly Group IIb such as magnesium, zinc, cadmium, and mercury and metals of Group IV, such as titanium, tin, lead and the like, and combinations thereof. The alkali metals of our composition include those monovalent metals of Group I, and particularly Group Ia, such as sodium, potassium, lithium, cesium and combinations thereof.

The metal and alkali metal-containing compounds of our compositions may be employed as organic or inorganic compounds or combinations thereof. For example, inorganic salts may include such compounds as oxides, carbonate, phosphites, halides phosphates and the like. Suitable specific compounds would include zinc oxide, lead carbonate, potassium chloride, lead dibasic phosphite and the like. However, the use of compounds containing organic radicals is generally recommended for use with plastic compositions to promote solubility of the compounds into the organic plastic compositions. Suitable organic radicals would comprise aromatic arenes, aliphatic, alicyclic, heterocyclic, alkylene, and the like. For example suitable aliphatic radicals would include: short and long chain fatty acids like tallates, oleates, acetates, propionates, 2-ethyl hexoates ricinoleates, myristates, octoates, stearates, resin soaps and the like, and mixtures thereof; alicyclic radicals include naphthenes and the like; aromatics include phthalates, phenates, benzoates, and the like, as well as other radicals such as mercaptides, etc.

The heavy metal, an alkaline metal-containing compounds of our compositions are often formed by the reaction of the metal or a metal salt with an organic acid such as a mono, or polycarboxylic acid or its derivatives to form the corresponding metal salt or metal soap. Alkali soaps of long chain fatty acids of more than 6 carbon atoms together with heavy metal containing soaps of from 2 to 12 carbon atoms have been found to be an excellent combination for use in vinyl compositions.

Granulate azodicarbonamide is decomposed in the presence of our activating composition at very low temperatures. It has also been found that when very finely divided azodicarbonamide is employed in combination with our activating composition, even lower decomposition temperatures may be obtained. For example, it has been found that azodicarbonamide precipitated, or ground to a particle size range of from about 0.1 to 5 microns with an average particle size range of about 2.0 to 1.8 microns or less in combination with our activating compositions evolves gas at temperatures of about 130 to 140° C. or lower.

Activation of azodicarbonamide is achieved when the weight ratio of the alkali metal to the heavy metal is from about one to five to five to one with optimum results observed at a ratio about one to two. The activating composition of our invention is commonly employed in a ratio of activating composition to the blowing agent of from one to ten to about four to one with good results obtained at a ratio of about one to two. The activated azodicarbonamide composition is incorporated in a plastic composition in a sufficient amount to effect the desired chemical blowing chemical action. This amount may vary from about 0.5 to 50 parts of the activated diazocarbonamide composition to 100 parts of the plastic or resin content of the fluid, plastic composition. In atmosphere, or in open mold blowing operations, such as in blowing, or forming, blown, cellular plastic sheets or layers on a carrier sheet from one to ten parts per one hundred parts of the resin are commonly employed. In closed mold, or pressure molding operations higher amounts of from ten to fifty parts per one hundred parts of the resin are often used.

The heavy metal compound, alkali metal compound and the azodicarbonamide may be premixed together or added separately, or in any combination, to the plastic composition. The desired heavy metal and alkali metal concentration to obtain activation may be obtained from other ingredients added to the plastic composition for other purposes. For example, all, or part of, the heavy metal concentration may be obtained from heavy metal phosphites, or soaps, or alkaline earth-heavy metal soaps added to the plastic composition as stabilizers. One method of preparing suitable compositions for use is to form a fluid slurry of the activating compositions, or the activated azodicarbonamide compositions in a plasticizer, or a plasticizer-resin mixture.

The activated azodicarbonamide compositions of our invention may be employed with a wide variety of plastic compositions to produce open or closed, cellular structures in block, sheet or in other form. Our composition will find particular utility with those thermosetting and thermoplastic compositions which require lower decomposition temperatures than those normally obtained with azodicarbonamide. Suitable gas-retentive and gas-expandable, organic polymeric plastic materials and compositions would include but are not limited to: vinyl resins and vinyl resin compositions which may comprise a vinyl resin dispersed in a high boiling plasticizer which plasticizer solvates the resin at an elevated temperature to produce a fused, flexible vinyl resin; natural and synthetic elastomers, like natural rubber and natural rubber latices; butyl and chlorobutyl rubbers, ethylene-propylene rubbers and terpolymers thereof; vinyl-diene copolymers like styrene-butadiene copolymers; nitrile rubbers like acrylonitrile-diene copolymers; polydienes like polybutadienes; polyisoprenes; polychloroprene; silicones, epoxy resins; phenolic resins like phenol-formaldehyde resins; urea-aldehyde resins; polyolefines particularly low melting point, branch chain polyethylene and polypropylene and the like; polyesters; alkyd resins; polystyrene; olefine polysulfides; polyethers; cellulosic esters and other resins; and mixtures and combinations thereof. These plastic compositions may be in latex, bulk, emulsion or solution form. The vinyl resins are often employed in high boiling point ester type plasticizers such as the aliphatic and aromatic alkyl esters like dialkyl and monoalkyl phthalates. These vinyl halide resins include polyvinyl chloride and copolymers of vinyl chlorides with vinyl esters of short chain fatty acids, like vinyl acetate, vinyl propionate, as well as other vinyl halides such as vinylene and vinylidiene chlorides and the like and copolymers with dibutenoic acid esters and the like and combinations thereof. These blowable, organic plastic materials are characterized by being capable of setting to a normally solid state either by cooling or curing, and have sufficient consistency in tensile strength at temperatures of from about 80° C. to 200° C. or higher to retain the expanded structure resulting from the evolvement of the gas either in the mold or when removed therefrom.

The plastic materials in which the activated azodicarbonamide compositions of our invention are incorporated can be formed either before or after blowing by coating, slush molding, compression or injection molding, extrusion or combinations thereof. The foam material can be retained in cellular structure by cooling in the case of thermoplastics and by cooling and curing with curing agents or effecting cross linking in the case of thermosetting materials. The cellular material can be formed on sheets such as paper, canvass, cloth plastic films, screens and the like and will find particular utility such as shoe soling, gaskets, shock absorbing functions and the like.

The plastic materials may also contain other ingredients and additives to enhance other properties such as to promote processing of final product acceptance. These additional materials may include heat and light stabilizers, plasticizers, antioxidants, dispersing agents, wetting agents, lubricating agents, pigments, dyes, blending resins, curing agents and the like in combination thereof. These additives would include organic phosphorous compounds, epoxides, low and high boiling ester-type plasticizers, low volatility polyols, fatty acids and fatty acid soaps, alkanol amines, amines, poly alkaline polyamines, like diethylene diamine and low molecular glycols and the like. These plastic materials may also include inert filler materials, such as clays, metal oxides, carbonates, whitenings, asbestos, glass fibers, woodflour, diatomaceous earth and the like in a ratio of from 20 to 300 parts of inert filler material to each hundred parts of resin.

The activated compositions, or the activated azodicarbonamide compositions, of our invention can be incorporated into the material by a number of methods. It may be added as a plasticizer slurry or in an organic solvent solution to the resin-plasticizer composition. It may be admixed with the solid resin or added directly to the resin during processing or by any method wherein the azodicarbonamide and the activating composition are combined and uniformly admixed in the plastic composition.

Our invention is further illustrated by the following detail of examples:

EXAMPLE 1

A vinyl resin ester plasticizing dispersion composition was prepared of the following ingredients:

| Ingredients: | Parts by weight |
|---|---|
| [1] Vygen 161 | 70.0 |
| [1] Vygen 85 | 30.0 |
| Dioctyl phthalate | 90.0 |
| Epoxidized soybean oil | 5.0 |
| Pigments | 6.5 |
| Azodicarbonamide (average particle size less than about 3.0 microns) | 4.0 |
|  | 205.5 |

[1] Essentially a polyvinyl chloride resin of varying molecular weight manufactured by the General Tire Co.

The following additives were then thoroughly dispersed and incorporated into the above information and a thin layer of the resulting formulation heated under atmospheric conditions to a temperature of about 203° C. for 50 seconds and cooled. The apparent density of the resulting foamed sheet was then determined by measuring the thickness of the foamed resin sheet with a Randall-Stickney thickness gauge and from the surface area and the weight of sheet sample the apparent density calculated therefrom. The density data obtained with each additive composition was as follows:

TABLE I

| | Additive | Parts/100 parts of vinyl resin | Apparent Density, lbs./cu. ft. |
|---|---|---|---|
| 1 | | | 72 |
| 2 | Zinc oxide | 3.0 | 72 |
| 3 | Barium myristate | 3.0 | 72 |
| 4 | Zinc oxide<br>Barium myristate | 3.0<br>3.0 | 64½ |
| 5 | Potassium oleate<br>Barium myristate | 5.2<br>3.0 | 54 |
| 6 | Potassium oleate<br>Barium myristate<br>Zinc oxide | 5.2<br>3.0<br>3.0 | 19½ |

The resulting data demonstrates a wide difference in vinyl foam density at similar air temperatures and residences times indicating a lowering of the decomposition temperature of the blowing agent by the activating effect of the additives. The use of Group II additives alone, such as zinc oxide, or the oil soluble barium soap, gave little if any change in foam density. The combination of both the barium soap and the zinc oxide gave a small reduction of about six lbs. per cubic foot in density. The combination of an alkali metal and an alkali earth metal of potassium and barium soaps yielded a three-fold reduction in foam density of about 18 lbs. per cubic foot. The employment of a combination of a heavy metal of Group IIb such as zinc, with the alkali metal potassium produced a fully unexpected activating effect and gave a reduction in foam density of over 52 lbs. per cubic foot. This example illustrates that the decomposition temperature of azodicarbonamide and the apparent density of the plastic composition containing this blowing agent can be substantially lowered by employing the activating admixture of an alkali metal and a heavy metal.

EXAMPLE 2

An activated azodicarbonamide dispersion for the production of a chemically blown cellular vinyl composition was prepared as follows:

*Activated blowing agent dispersion*

| | Rate by weight |
|---|---|
| Azodicarbonamide (average particle size of 1.4 microns or less) | 165 |
| Zinc 2-ethyl hexoate (22% zinc content) | 54 |
| Potassium oleate (85% active) | 25 |
| Dioctyl phthalate | 295.5 |
| Dispersing agent such as a fatty acid amine or amide | 2.5 |
| | 542.0 |

The potassium soap was dispersed in the ester plasticizer until a uniform dispersion was obtained, and the zinc compound added and blended to produce a uniform dispersion. The dispersing agent was then added followed by the finely divided azodicarbonamide which was added slowly with stirring until a uniform yellow slurry poured readily at room temperature was obtained. This dispersion when incorporated into a plastic material for blowing purposes had a decomposition temperature of about 140° C. or less. This dispersion also possesses a faster decomposition rate than a conventional azodicarbonamide with equivalent amount of either a dibasic lead phosphite, or a barium-cadmium-zinc soap additive.

The above dispersion was incorporated in the following formulation to provide a plastic material capable of being blown as follows:

*Vinyl resin formulation A*

| | Parts by weight |
|---|---|
| [1] PVC #7402 | 100.00 |
| Dioctyl phthalate | 65.00 |
| Butyl octyl phthalate | 30.00 |
| Flexol EPO (epoxidized soybean oil) | 5.0 |
| Titanium oxide | 5.0 |
| Activated blowing dispersion | 6.1 |
| | 211.1 |

[1] A homopolymer of polyvinyl chloride manufactured by Diamond Alkali Co.

Similarly a vinyl-ester plasticizer like that above was prepared for comparison purposes and identified as formulation B. In B formulation the blowing agent dispersion contained azodicarbonamide having an average particle size of about 3.0 microns, and the potassium and zinc soaps were replaced by an equivalent amount of a liquid vinyl stabilizer identified as Ferro 1720. This stabilizer comprises a mixture of barium, cadmium and zinc compounds, such as barium phenate and cadmium and zinc 2-ethyl hexoates.

These Formulations A and B were thereafter evaluated in the degree of expansion as a function of temperature and residence time in an air oven with the results graphically illustrated in the accompanying drawings.

In FIG. 1 with a residence time in the air oven of 1¼ minutes, Formulations A and B varied considerably in foam density with temperature. Formulation B had an activated temperature at which the blowing agent decomposed to evolve gas of approximately 170 to 180° C., while the decomposition temperature of the azodicarbonamide in Formulation A was about 150° C. The Formulation A also yielded foam densities as low as 10 to 15 lbs. per cubic foot, while Formulation B at similar temperatures yielded densities twice that of Formulation A. The superiority of the alkali-heavy metal combination over the alkaline-earth mixture was therefore readily apparent from this graphical data.

In FIG. 2 the degree of expansion of each Formulation A and B is shown as a function of residence time, at a temperature of about 200° C. Our inventive combination was considerably superior in providing low density foam in a relatively short period of time than the use of Formulation B. This ability to achieve low foam densities in shorter residence time is most desirable since it promotes the reduction of heat degradation of the plastic materials, enhances production efficiency and improves processing rates.

EXAMPLE 3

Suitable combinations of alkali metal-heavy metal compounds for activating purposes include but are not limited to the following admixtures:

I.—Dibasic lead phthalate, sodium stearate
II.—Titanium octoate, sodium phenate
III.—Cadmium naphthenate, lithium hydroxy stearate
IV.—Barium naphthenate, potassium tallate, cadmium ricinoleate
V.—Magnesium oxide, zinc oxide, potassium lauryl sulfate
VI.—Tin mercaptide, lithium carbonate, potassium oleate
VII.—Titanium oxide, zinc acetate, potassium 2-ethyl hexoate Our invention by a combination of a heavy metal and an alkali metal with or without very fine particle sized azodicarbonamide blowing agent permits the use of lower decomposition temperatures and shorter residence time in preparing cellular plastic foam material.

What we claim is:

1. An activated azodicarbonamide composition characterized by a decomposition temperature of about 160° C. or less, which composition comprises: finely divided azodicarbonamide having an average particle size range of from about 0.1 to 5.0 microns; a heavy metal compound selected from the group consisting of zinc, cadmium, lead, barium, tin and combinations thereof; and an alkali metal compound, the ratio of heavy metal to alkali metal ranging from about 5:1 to 1:5.

2. The composition of claim 1 wherein the alkali metal is potassium.

3. The composition of claim 1 wherein the azodicarbonamide has an average particle size of less than about 3.0 microns, the alkali metal is potassium, and the heavy metal is a combination of barium and zinc.

4. An activated azodicarbonamide composition which comprises: a liquid organic plasticizer; finely divided azodicarbonamide having an average particle size range of from about 0.1 to 5.0 microns; an organic oil-soluble heavy metal salt selected from the group consisting of zinc, cadmium, lead, barium, tin and combinations thereof; and an organic oil-soluble potassium salt, the ratio of heavy metal to potassium being from about 5:1 to 1:5 and the ratio of heavy metal and potassium to azodicarbonamide being from about 1:10 to 4:1.

5. A method of fabricating a cellular structure at a low temperature which method comprises: incorporating into a polymeric gas-expandable organoplastic a blowing amount of finely divided azodicarbonamide having an average particle size range of from about 0.1 to 5.0 microns; a heavy metal compound selected from the group consisting of zinc, cadmium, lead, barium, tin and combinations thereof; and an alkali metal compound, the ratio of heavy metal to alkali metal ranging from 5:1 to 1:5; and, thereafter heating the organoplastic to a temperature less than 160° C. to decompose the azodicarbonamide and form an expanded cellular structure.

6. The method of claim 5 wherein the alkali metal is potassium.

7. The method of claim 5 which includes varying the average particle size of the azodicarbonamide so as to lower the decomposition temperature of the azodicarbonamide to less than about 140° C.

8. The method of claim 5 wherein the organoplastic is a thermoplastic vinyl chloride resin and the heavy metal and alakali metal compounds are organic oil-soluble salts.

9. The composition which comprises a polymeric gas-expandable organoplastic, a blowing amount of finely divided azodicarbonamide having an average particle size range of from about 0.1 to 5.0 microns; a heavy metal compound selected from the group consisting of zinc, cadmium, lead, barium, tin and combinations thereof; and an alkali metal compound, the ratio of heavy metal to alkali metal ranging from about 5:1 to 1:5.

10. The combination of claim 9 wherein the organoplastic is a vinyl resin plastisol and the alkali metal compound is an oil soluble potassium salt.

11. The composition of claim 9 wherein the azodicarbonamide has an average particle size of less than about 3.0 microns, the alkali metal is potassium, and the heavy metal is a combination of barium and zinc.

References Cited by the Examiner

UNITED STATES PATENTS

| | | | |
|---|---|---|---|
| 2,446,976 | 8/1948 | Cousins | 260—45.75 |
| 2,804,435 | 8/1957 | Reed | 260—2.5 |
| 2,964,799 | 12/1960 | Roggi et al. | 260—2.5 |
| 3,017,371 | 1/1962 | Hohenberg et al. | 260—2.5 |
| 3,197,423 | 7/1965 | Ackerman | 260—2.5 |

MURRAY TILLMAN, *Primary Examiner.*

M. F. OELAK, *Assistant Examiner.*